US 8,391,244 B2

(12) United States Patent
Choi et al.

(10) Patent No.: US 8,391,244 B2
(45) Date of Patent: Mar. 5, 2013

(54) RADIO COMMUNICATION TERMINAL DEVICES, RADIO COMMUNICATION NETWORK SYSTEM, METHOD FOR OPERATING A RADIO COMMUNICATION TERMINAL DEVICE

(75) Inventors: Hyung-Nam Choi, Hamburg (DE); Manfred Zimmermann, Sauerlach (DE)

(73) Assignee: Intel Mobile Communications GmbH, Neubiberg (DE)

( * ) Notice: Subject to any disclaimer, the term of this patent is extended or adjusted under 35 U.S.C. 154(b) by 1100 days.

(21) Appl. No.: 12/191,604

(22) Filed: Aug. 14, 2008

(65) Prior Publication Data
US 2010/0040037 A1   Feb. 18, 2010

(51) Int. Cl.
*H04W 4/00* (2009.01)

(52) U.S. Cl. ............. 370/332; 370/310.2; 370/345; 370/436; 370/442; 370/477; 370/498; 455/422.1

(58) Field of Classification Search ........... 370/310.2, 370/328–339, 345, 347, 349, 436, 442, 477, 370/478, 498; 455/72, 422.1; 709/247; 379/98.03
See application file for complete search history.

(56) References Cited

U.S. PATENT DOCUMENTS

| 7,372,842 | B2 | 5/2008 | Kim et al. | |
|---|---|---|---|---|
| 2003/0108027 | A1* | 6/2003 | Kim et al. | 370/345 |
| 2005/0094561 | A1* | 5/2005 | Raaf | 370/235 |
| 2005/0213575 | A1 | 9/2005 | Shin et al. | |
| 2007/0037601 | A1* | 2/2007 | Mittal et al. | 455/525 |
| 2009/0270103 | A1* | 10/2009 | Pani et al. | 455/436 |
| 2011/0076999 | A1* | 3/2011 | Kazmi et al. | 455/423 |

FOREIGN PATENT DOCUMENTS

| EP | 1 511 241 A2 | 3/2005 |
|---|---|---|
| EP | 1 565 023 A2 | 8/2005 |
| EP | 1 901 494 A1 | 3/2008 |
| WO | WO-2005/109725 A1 | 11/2005 |
| WO | WO-2006/103618 A1 | 10/2006 |

OTHER PUBLICATIONS

3GPP TS 25.214 v8.2.0, 3rd Generation Partnership Project; Technical Specification Group Radio Access Network; Physical layer procedures (FDD) (Release 8), May 2008, 3GPP.*
3GPP TR 25.825 v1.0.0, 3rd Generation Partnership Project; Technical Specification Group Radio Access Network; Dual-Cell HSDPA operation, May 2008, 3GPP.*
"Feasibility Study on Dual-Cell HSDPA operation", 3GPP TSG RAN #39—RP-080148, Puerto Vallarta, Mexico, Mar. 4-7, 2008, 3GPP.*
Seidel et al., "White Paper—Dual Cell HSDPA and its Future Evolution", Jan. 2009, nomor (novel mobile radio) research.*
"Dual-Cell HSDPA operation on adjacent carriers", 3GPP TSG RAN #40—RP-080490, Prague, Czech Republic, May 27-30, 2008, 3GPP.*
"System Benefits for Dual Carrier HSDPA", 3GPP TSG RAN WG1 #52bis—R1-081361, Shenzhen, China, Mar. 31-Apr. 4, 2008, 3GPP.*

(Continued)

*Primary Examiner* — Hoon J Chung
(74) *Attorney, Agent, or Firm* — Schiff Hardin LLP

(57) ABSTRACT

In an embodiment, a radio communication terminal device is provided. The radio communication terminal device may include a receiver configured to receive radio data signals via a first frequency carrier and a second frequency carrier, and a controller configured to control the receiver such that the receiver does not receive radio data signals via the first frequency carrier during a transmission gap, and such that the receiver receives radio data signals via the second frequency carrier during the transmission gap.

14 Claims, 7 Drawing Sheets

OTHER PUBLICATIONS

"Initial Multi-Carrier HSPA performance evaluation", 3GPP TSG RAN WG1 Meeting #52bis—R1-081546, Shenzhen, China, Mar. 31-Apr. 4, 2008, 3GPP.*

"Simulation Assumptions for DC HSDPA Performance Evaluations", 3GPP TSG RAN WG1 #53—R1-081706, Kansas City, US, May 5-May 9, 2008, 3GPP.*

"Initial simulation results for dual cell HSDPA operation", 3GPP TSG RAN WG1 Meeting #53—R1-081903, Kansas City, USA, May 5-May 9, 2008, 3GPP.*

"System simulation results for DC-HSDPA operation", 3GPP TSG RAN WG1 Meeting #53—R1-082135, Kansas City, USA, May 5-9, 2008, 3GPP.*

"Text proposal for TR on simulation results", 3GPP TSG RAN WG1 #53bis—R1-082094, Kansas City, US, May 5-9, 2008, 3GPP.*

Ghadialy, "Introduction to Compressed Mode Measurements procedure", Jul. 18, 2005.*

Qualcomm Europe: 3GPP TSG-RAN WG4, R4-081353; Meeting #47-bis, Munich, Germany, Jun. 16-20, 2008.

Samsung: 3GPP TSG RAN WG1, R1-081241; Meeting #52bis, Shenzhen, China, Mar. 31-Apr. 4, 2008.

ETSI TS 125 321 V7.9.0 (Jul. 2008); Universal Mobile Telecommunications System (UMTS); Medium Access Control (MAC) protocol specification (3GPP TS 25.321 version 7.9.0 Release 7).

ETSI TS 125 212 V&.8.0 (Jul. 2008); Universal Mobile Telecommunications System (UMTS); Multiplexing and channel coding (FDD) (3GPP TS 25.212 version 7.8.0 Release 7).

ETSI TS 125 214 V7.9.0 (Jul. 2008); Universal Mobile Telecommunications System (UMTS); Physical layer procedures (FDD) (3GPP TS 25.214 version 7.9.0 Release 7).

Tdoc RP-080228: Feasibility Study on Dual-Cell HSDPA operation, Qualcomm et al., Sep. 5, 2008.

3GPP TS 25.215 V3.13.0 (Mar. 2005): 3rd Generation Partnership Project; Technical Specification Group Radio Access Network; Physical layer—Measurements (FDD) (Release 1999).

3GPP TS 25.211 V5.8.0 (Dec. 2005): 3rd Generation Partnership Project; Technical Specification Group Radio Access Network; Physical channels and mapping of transport channels onto physical channels (FDD) (Release 5).

3GPP TS 34.108 V6.5.0 (Dec. 2006): 3rd Generation Partnership Project; Technical Specification Group Radio Access Network; Common test environments for User Equipment (UE); Conformance testing (Release 6).

* cited by examiner

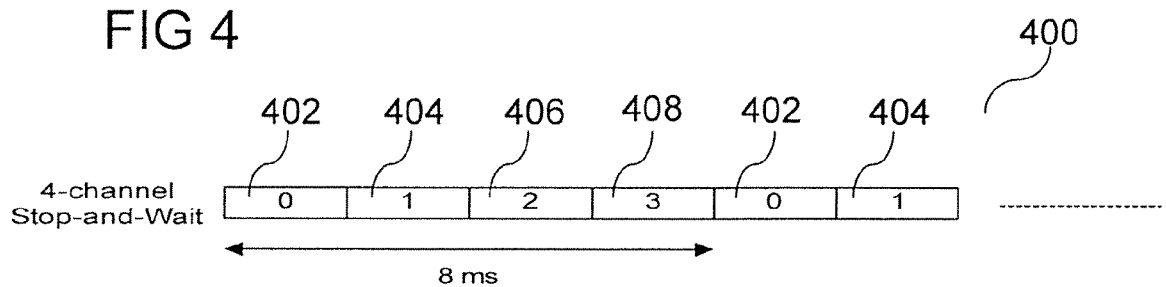
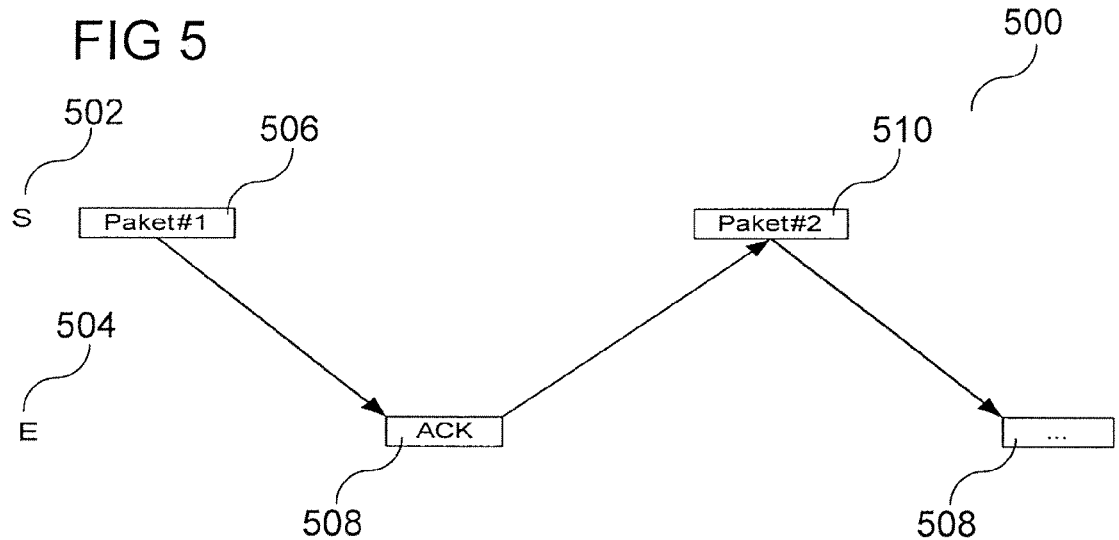

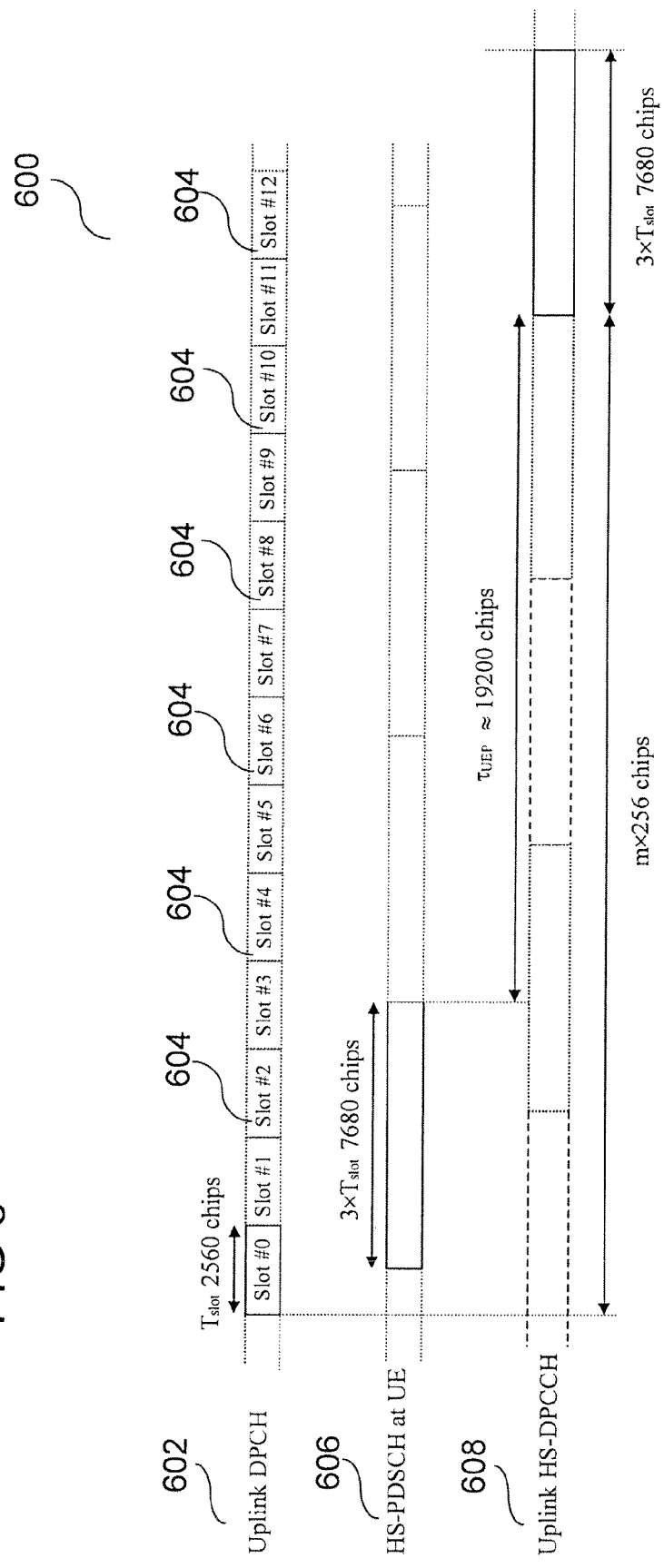

RADIO COMMUNICATION TERMINAL DEVICES, RADIO COMMUNICATION NETWORK SYSTEM, METHOD FOR OPERATING A RADIO COMMUNICATION TERMINAL DEVICE

TECHNICAL FIELD

Embodiments relate generally to radio communication terminal devices, a radio communication network arrangement, and a method for operating a radio communication terminal device.

BACKGROUND

In a UMTS (Universal Mobile Telecommunications System) communications systems using W-CDMA (Wideband Code Division Multiple Access) and a so-called FDD (Frequency Division Duplex) mode, the so-called "Compressed Mode" procedure is specified to allow UEs (User Equipments), which e.g. have only one receiver part (e.g. for cost reasons), inter-frequency-measurements (i.e., e.g., on UMTS mobile radio cells, which are operated on another frequency band compared with the frequency band used for the current mobile radio cell in which the UEs are located) and inter-RAT (Radio Access Technology)-measurements (i.e., e.g., on mobile radio cells of another mobile radio communications system, e.g. GSM (Global System for Mobile Communication). A defined number of inter-frequency-measurements and/or inter-RAT-measurements may be defined in UMTS. Each of these measurements is configured for a UE by the mobile radio communications network using individual compressed-mode parameters.

In more detail, the "Compressed Mode" procedure generates transmission gaps in the uplink transmission direction (Uplink: e.g. signal transmission from a mobile radio terminal device to an associated respective base station) and/or in the downlink transmission direction (Downlink: e.g. signal transmission from the associated respective base station to the mobile radio terminal device), which should be used by the User Equipment UE for the respectively configured measurements. By way of example, in the case of the downlink transmission direction, the mobile radio base station (in the case of UMTS also referred to as NodeB) interrupts the data transmission to the mobile radio terminal device (in the case of UMTS also referred to as UE) during the period of the configured transmission gaps. Furthermore, in the case of the uplink transmission direction, the mobile radio terminal device (in the case of UMTS also referred to as UE) interrupts the data transmission to the mobile radio base station (in the case of UMTS also referred to as NodeB) during the period of the configured transmission gaps.

In those cases, in which transmission gaps are generated in the uplink transmission direction by the configured "Compressed Mode" parameters, this may result in performance losses with respect to the data throughput and the transmission delay, since e.g. data transmissions in the downlink transmission direction may not be acknowledged in time in accordance with the so-called HARQ (Hybrid Automatic Repeat Request) procedure using uplink transmissions.

This situation becomes more severe in future data services having high data rates and a HSDPA (High Speed Downlink Packet Access) transmission using a plurality of (e.g. two) mobile radio cells.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 4 shows a block diagram illustrating an N-channel Stop-and-Wait procedure with N=4 in accordance with an embodiment;

FIG. 5 shows a block diagram illustrating an N-channel Stop-and-Wait procedure with N=1 in accordance with an embodiment;

FIG. 6 shows a diagram illustrating the timing of uplink transmission and downlink transmission in accordance with HSDPA;

DESCRIPTION

In various embodiments, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be software being implemented or executed by a processor, e.g. any kind of computer program, e.g. a computer program using a virtual machine code such as e.g. Java, thereby e.g. implementing an individually programmed circuit. Any other kind of implementation of the respective functions which will be described in more detail below may also be understood as a "circuit" in accordance with an alternative embodiment. In an embodiment, a plurality of circuits may be partially or completely implemented in one common circuit such as e.g. in one common processor such as e.g. one common microprocessor.

Figure 1:
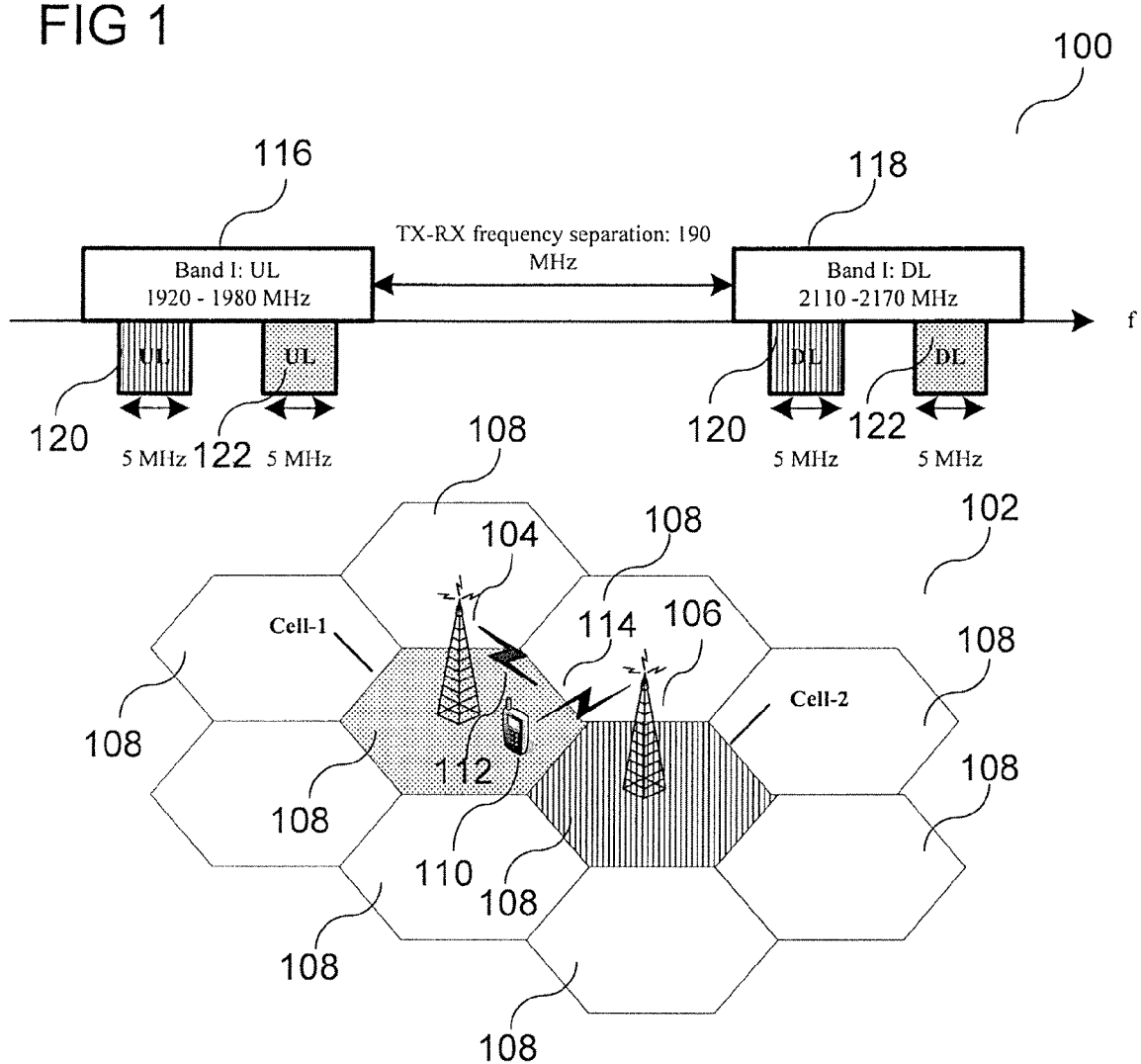
FIG. 1 shows a mobile radio communications system in accordance with an embodiment.

FIG. 1 shows a mobile radio communications system 100 in accordance with an embodiment. The mobile radio communications system 100 may include a mobile radio communication network arrangement 102, which may include one or a plurality of mobile radio base stations 104, 106. One or more mobile radio base stations 104, 106 may respectively be provided for supplying mobile radio communication within a predefined respective mobile radio coverage area, also referred to as a mobile radio cell 108. Furthermore, the mobile radio communications system 100 may further include one or a plurality of mobile radio communication terminal devices 110 (although only one mobile radio communication terminal device 110 is shown in FIG. 1, an arbitrary number of mobile radio communication terminal devices 110 may be provided in the mobile radio communications system 100). Furthermore, the mobile radio communications system 100 may include additional mobile radio communication network devices (depending on the architecture of the respective mobile radio communications system 100) such as e.g. a radio network controller (RNC), various location registers (e.g. a visitor location register (VLR) or a home location register (HLR)), etc., which are not shown in FIG. 1 for reasons of clarity.

In an embodiment, the mobile radio communications system 100 (and thus inter alia the mobile radio communication network arrangement including the base stations 104, 106 as well as the mobile radio communication terminal device(s) 110) may be configured in accordance with one or more mobile radio communications standards. By way of example, mobile radio communications system 100 may be configured in accordance with one or more 3GPP (Third Generation Partnership Project) mobile radio communications standards. In another example, the mobile radio communications system 100 may be configured in accordance with a mobile radio technology selected from a group of mobile radio technologies consisting of: Universal Mobile Telecommunications System (UMTS) mobile radio technology, Long Term Evolution (LTE) mobile radio technology, Code Division Multiple Access (CDMA) mobile radio technology, Code Division Multiple Access 2000 (CDMA 2000) mobile radio technology, Freedom of Mobile Multimedia Access (FOMA) mobile radio access technology, Global System for Mobile Communications (GSM) mobile radio access technology, and Enhanced Data rates for GSM Evolution (EDGE) mobile radio access technology.

Although in the following, the embodiments will be described in more detail using UMTS as an example, it is to be noted that the embodiments may be implemented also using any other suitable mobile radio technology, e.g. one or more of the mobile radio technologies mentioned above.

As shown in FIG. 1, the mobile radio communication terminal device 110 may be connected via one or more mobile radio communication connections 112, 114 to the mobile radio base stations 104, 106, e.g. via a first mobile radio communication connection 112 to a first mobile radio base station 104, and via a second mobile radio communication connection 114 to a second mobile radio base station 106.

As will be described in more detail below, various embodiments use a dual-cell transmission, e.g. a dual-cell HSDPA (High Speed Downlink Packet Access) transmission. In accordance with various embodiments, a UMTS HSDPA system is assumed. The UMTS HSDPA system 100 may support a maximum net data rate of approximately 42 Mbps (Megabits per second) for a downlink transmission direction (Downlink: e.g. signal transmission from the associated respective base station 104, 106 to the mobile radio communication terminal device 110) into a mobile radio cell 108 based on the multiple access procedure W-CDMA (Wideband Code Division Multiple Access) and the FDD (Frequency Division Duplex) mode. In a conventional UMTS HSDPA system, it is not possible to provide a consistent (i.e. stable without interruption) data throughput for a mobile radio communication terminal device 110 (such as e.g. a User Equipment (UE) 110) in the entire coverage region of the mobile radio cell 108, in particular in the border area of the mobile radio cell 108. One reason for this effect may be seen in that in a conventional UMTS HSDPA system, the UE 110 may receive data in downlink transmission direction only via one mobile radio cell 108, in other words, via only one mobile radio base station 104, 106 and that the quality of the data reception may vary due to the mobility of the user and thus due to the mobility of the UE 110.

Therefore, it is an ongoing topic e.g. in the 3GPP standardization group to examine the feasibility of the HSDPA transmission via two mobile radio cells 108 and thus via one or a plurality of mobile radio base stations 104, 106.

As an example, the configuration of the UMTS HSDPA system 100 as shown in FIG. 1 may be as follows:

Two mobile radio cells 108 are operated in the same frequency band (e.g. for uplink transmission direction (Uplink: e.g. signal transmission from a mobile radio terminal device 110 to an associated respective base station 104, 106): 1920 MHz to 1980 MHz (symbolized in FIG. 1 with reference number 116) and for downlink transmission direction: 2110 MHz to 2170 MHz (symbolized in FIG. 1 with reference number 118), but on different FDD frequency pairs, e.g. a first FDD frequency pair 120 and a second FDD frequency pair 122, each frequency pair having two FDD frequency pair portions (an uplink FDD frequency pair portion and a downlink FDD frequency pair portion, respectively). In an example, each FDD frequency pair portion may have a frequency bandwidth of approximately 5 MHz.

Both mobile radio cells 108 may be spanned by one and the same mobile radio base station 104, 106 or by two different mobile radio stations 104, 106, for example.

The mobile radio terminal device 110 (e.g. the UE 110) is registered in the first mobile radio cell 108, however, it can receive independent data messages or data streams via both mobile radio cells 108 in the downlink transmission direction.

The mobile radio terminal device 110 (e.g. the UE 110) transmits its data to be transmitted in the uplink transmission direction only via the uplink frequency band provided by the first mobile radio cell 108, in which the mobile radio terminal device 110 (e.g. the UE 110) is also registered.

From the point of view of a user, one effect of a dual-cell HSDPA transmission compared with a single-cell HSDPA transmission may be seen in an improvement of the data throughput in the entire coverage area of the mobile radio cell 108, e.g. in the border area of the mobile radio cell 108.

In order to carry out inter-frequency-measurements on UMTS mobile radio cells 108 or inter-RAT (radio access technology)-measurements on GSM mobile radio cells, in a UMTS communications system 100, in accordance with an embodiment, based on the W-CDMA multiple access procedure and the FDD mode, transmission gaps may be generated by means of the feature "Compressed Mode". "Compressed Mode" is a specific feature for generating transmission gaps in the uplink transmission and/or in the downlink transmission when the mobile radio communication terminal device 110 (e.g. a UE 110) is in the RRC (Radio Resource Control) state "CELL_DCH", in which state dedicated radio resources are allocated to a mobile radio communication terminal device 110 (e.g. a UE 110). To do this, the mobile radio communication network 102, and in particular the UTRAN (UMTS Terrestrial Radio Access Network), configures the mobile radio communication terminal device 110 (e.g. a UE 110) corresponding "Compressed Mode" parameters. The "Compressed Mode" parameters may include inter alia the length of the transmission gap (Transmission Gap length, TGL), the distance between the start of two transmission gaps (Transmission Gap start Distance, TGD) and the duration of the application of the transmission gaps (Transmission Gap Pattern Length, TGPL).

In UMTS, there is defined a number of inter-frequency measurements and/or inter-RAT-measurements. Each of these measurements may be configured to a mobile radio terminal device 110 (e.g. a UE 110) by the mobile radio network with individual Compressed-Mode parameters, i.e. the configured transmission gaps usually do not overlap each other in the time domain. As an example, table 1 shows an example of a configuration of the Compressed-Mode parameters for an inter-frequency-measurement (i.e. a measurement of UMTS FDD-cells on other frequencies) and three inter-RAT-measurements (i.e. measurements on GSM cells).

tive data packet for each error-free received data packet a positive acknowledgement message (ACK) via the feedback channel. In a corresponding manner, the receiver may transmit to the transmitter of a respective data packet for each

TABLE 1

| Parameter | Inter-Frequency FDD | GSM Carrier RSSI | GSM Initial BSIC identification | GSM BSIC re-confirmation |
|---|---|---|---|---|
| TGSN (Transmission Gap Starting Slot Number) | 8 | 8 | 8 | 8 |
| TGL1 (Transmission Gap Length 1) | 14 | 14 | 14 | 14 |
| TGL2 (Transmission Gap Length 2) | 14 | 14 | 14 | 14 |
| TGD (Transmission Gap Distance) | 0 | 60 | 45 | 0 |
| TGPL1 (Transmission Gap Pattern Length) | 12 | 24 | 24 | 24 |
| TGPL2 (Transmission Gap Pattern Length) | — | — | — | — |
| TGCFN (Transmission Gap Connection Frame Number): | (Current CFN + (238 − TTI/ 10 msec)) mod 256 | (Current CFN + (242 − TTI/ 10 msec)) mod 256 | (Current CFN + (256 − TTI/ 10 msec)) mod 256 | (Current CFN + (253 − TTI/ 10 msec)) mod 256 |
| UL/DL compressed mode selection | DL, UL or DL & UL | DL, UL or DL & UL | DL, UL or DL & UL | DL, UL or DL & UL |
| UL compressed mode method | SF/2 | SF/2 | SF/2 | SF/2 |
| DL compressed mode method | SF/2 | SF/2 | SF/2 | SF/2 |

The transmission gaps respectively amount to 14 time slots (which may also be the maximum length of a transmission gap) and may be applied for uplink transmission (UL), downlink transmission (DL), or for uplink transmission and downlink transmission (UL+DL). In the case of a downlink transmission, the base station 104, 106 (in UMTS also referred to as NodeB) may interrupt the data transmission to a mobile radio terminal device 110 (e.g. a UL 110) during the configured transmission gaps. In the case of an uplink transmission, the mobile radio terminal device 110 (e.g. the UE 110) may interrupt the data transmission to a mobile radio base station 104, 106 during the configured transmission gaps.

In accordance with various embodiments and in UMTS in accordance with the W-CDMA multiple access procedure and the FDD mode, in order to improve the data transmission in the downlink transmission direction, the feature "HSDPA" (High Speed Downlink Packet Access) has been introduced (e.g. in UMTS Release 5). In more detail, the feature "HSDPA" may include the application of techniques such as e.g. AMC (Adaptive Modulation and Coding), NodeB scheduling und HARQ.

HARQ (Hybrid Automatic Repeat Request) may be understood as an error correction method, which should ensure that data packets are successfully (in the sense of error-free) transmitted from a transmitter to a receiver. A reason for this may be seen in that the data transmission occurs via a mobile radio channel, which may, despite channel coding, change or distort the information contained in the data packets due to the characteristics of the mobile radio channel. The HARQ method is based on the combination of channel coding and ARQ (Automatic Repeat Request) mechanism, in which, in case that transmission errors occur, the received erroneous initial data packet will be repeated by the transmitter, but in this case associated with another channel coding redundancy information. At the receiver, the former received erroneous initial data packet will then be combined with the re-transmitted data packet and then jointly decoded.

Therefore, the receiver should check all received data packets for possible transmission errors and should inform the transmitter about the result of the check. This may be done in that the receiver may transmit to the transmitter of a respecerroneous received data packet a negative acknowledgement message (NACK) via the feedback channel. In case the transmitter of a respective data packet receives a notification or message that a specific data packet has been transmitted erroneously, the HARQ method initiates a repetition of the transmission (re-transmission) for the erroneously transmitted data packet. In case the transmitter of a respective data packet receives a notification or message that a specific data packet has been transmitted in an error-free manner, the HARQ method continues with the transmission of new data packets.

In general, the use of the HARQ method uses corresponding memory units in the transmitter and the receiver. A respective copy of each data packet to be transmitted is buffered in the memory of the transmitter until the data packet has been transmitted successfully or until the attempt of a successful transmission has been given up after a maximum number of re-transmissions. Then, the copy of the data packet may be deleted from the memory again. In a corresponding manner, a copy of each received data packet will be buffered at least as long as the data packet has been transmitted successfully or until the attempt of a successful transmission has been given up after a predetermined time period.

In various embodiments, any type of HARQ method may be used. By way of example, in a embodiment, in accordance with HSDPA, an asynchronous "N-channel Stop-and-Wait method" may be used, in which the parameter N may be configured by the mobile radio communication network in a flexible manner, e.g. in a range from the value "1" to the value "8". In the "N-channel Stop-and-Wait method", the transmit data packets may be physically transmitted via one single transmission channel, however, respectively divided in N subchannels in time scale. FIG. 4 shows a block diagram 400 illustrating an N-channel Stop-and-Wait procedure with N=4 in accordance with an embodiment, that is an example with four subchannels 402, 404, 406, 408, numbered from "0" to "3", each subchannel 402, 404, 406, 408 having a length of 2 ms, for example. The HARQ method may be applied to each subchannel of the four subchannels 402, 404, 406, 408, or, in other words, one HARQ process may be applied to each subchannel of the four subchannels 402, 404, 406, 408. The operation of the HARQ method for each subchannel 402,

404, 406, 408 may be as follows (as shown in another block diagram 500 in FIG. 5). The transmitter S 502 (e.g. a mobile radio base station 104, 106) may transmit a first data packet #1 506 to a receiver E 504 (e.g. a mobile radio communication terminal device 110) and respectively waits for the corresponding transmission result. Depending on the transmission result, the transmitter S 502 transmits a new second data packet #2 510 (in the case of a positive acknowledgement message ACK 508) or a copy of the previously transmitted first data packet #1 (optionally with a changed associated channel coding redundancy information) (in the case of a negative acknowledgement message NACK (not shown in FIG. 5)). In the time period, in which the transmitter S 502 waits for the transmission result, no data packets are transmitted via the respective subchannel 402, 404, 406, 408, i.e. the transmission capacities of the respective subchannel 402, 404, 406, 408 remain unused.

As already described above, HSDPA uses an asynchronous HARQ method, in which re-transmission from a base station 104, 106 (e.g. a NodeB) may be transmitted to the mobile radio terminal device 110 (e.g. a UE 110) independent from the transmission time instant (=HARQ process) of the initial transmission. However, the transmission of the acknowledgement messages (ACK/NACK) from the mobile radio terminal device 110 (e.g. a UE 110) to the base station 104, 106 (e.g. a NodeB) may be carried out in a synchronous manner, i.e. the mobile radio terminal device 110 (e.g. the UE 110) transmits the acknowledgement messages (ACK/NACK) in a fixed interrelation in time after having received the downlink data packets. The uplink transmission timing may approximately be 7.5 time slots (=19200 chips=5 ms), as e.g. shown in FIG. 6.

FIG. 6 shows a diagram 600 illustrating the timing of uplink transmission and downlink transmission in accordance with HSDPA. As shown in FIG. 6, in HSDPA, downlink transmission data packets are transmitted via the physical channel HS-PDSCH (high Speed Physical Downlink Shared Channel) 606 and the uplink transmission packet data acknowledgement messages are transmitted via the physical channel HS-DPCCH (high Speed Dedicated Physical Control Channel) 608. Furthermore, FIG. 6 shows the uplink transmission channel DPCH 602 (Dedicated Physical Channel) and the correspondingly provided time slots 604. The transmission time interval (TTI) of the HS-PDSCH 606 and the HS-DPCCH 608 (also referred to as subframe) is 2 ms.

Figure 2:
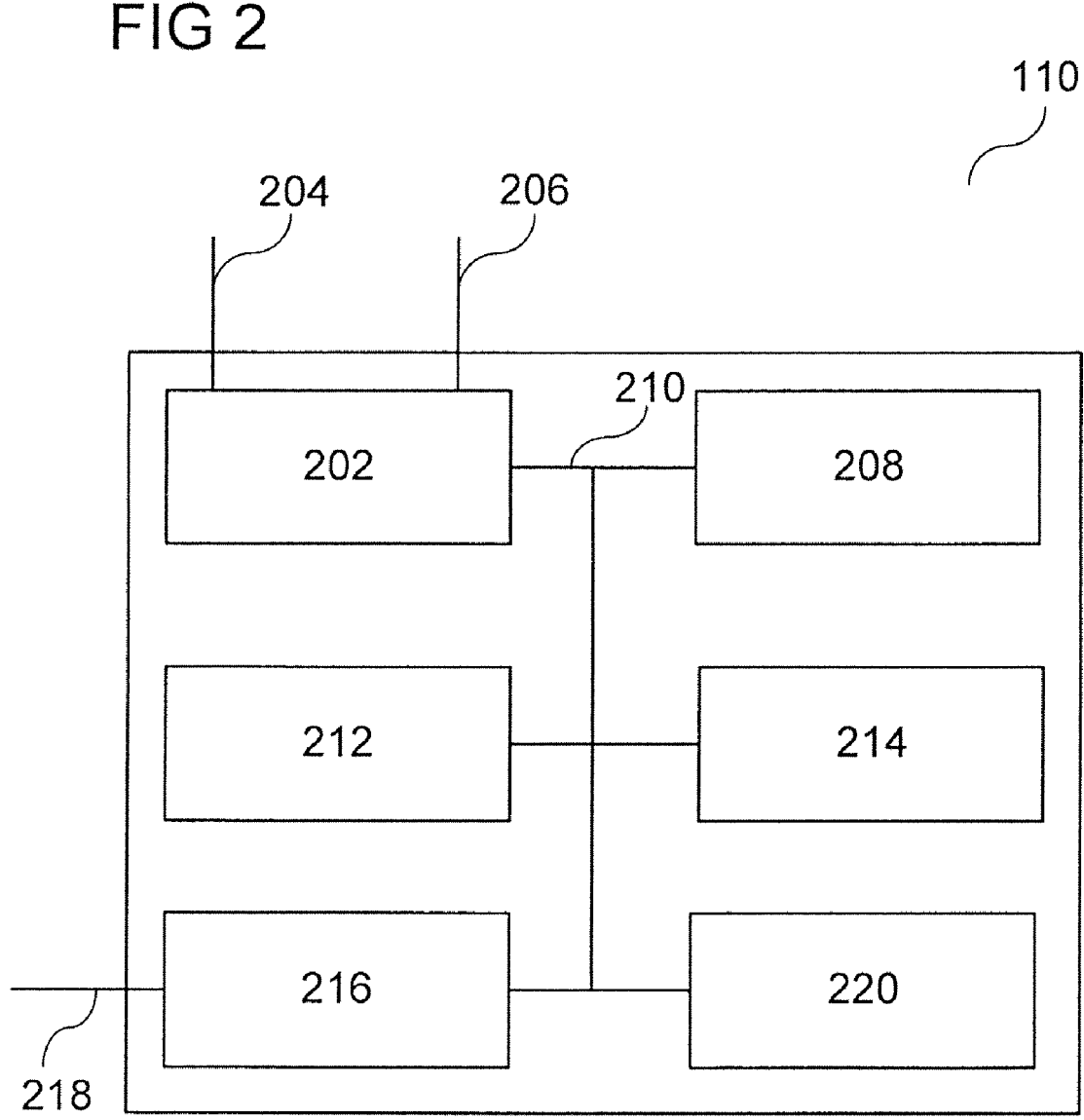
FIG. 2 shows a mobile radio communication terminal device in accordance with an embodiment in more detail.

FIG. 2 shows the mobile radio communication terminal device 110 in accordance with an embodiment in more detail. As shown in FIG. 2, the mobile radio communication terminal device 110 may include a receiver 202 configured to receive radio data signals via a first frequency carrier and a second frequency carrier. The receiver 202 may include one receiver part or a plurality of receiver parts. Furthermore, one receiving antenna 204 or a plurality of (e.g. two) receiving antennas 204, 206 coupled to the receiver 202 may be provided. Furthermore, the mobile radio communication terminal device 110 may include a controller 208 configured to control the receiver such that the receiver 202 does not receive radio data signals via the first frequency carrier during a transmission gap (e.g. by deactivating the receiver 202 during the transmission gap with respect to the first frequency carrier). The controller 208 may further be configured to control the receiver 202 such that the receiver 202 receives radio data signals via the second frequency carrier during the transmission gap. The controller 208 may be coupled to the receiver 202 via an electrical connection 210 such as a bus or other type of wiring. A controller (and thus e.g. the controller 208) may be understood as any kind of a control logic implementing entity, which may be hardware, software, firmware, or any combination thereof. A "controller" may include one or a plurality of processors, e.g. one or a plurality of programmable processors such as e.g. one or a plurality of programmable microprocessors. A "controller" may also be software being implemented or executed by a processor, e.g. any kind of computer program, e.g. a computer program using a virtual machine code such as e.g. Java, thereby e.g. implementing an individually programmed circuit. Any other kind of implementation of the respective functions which will be described in more detail below may also be understood as a "controller" in accordance with an alternative embodiment. A controller may alternatively or in addition include one or a plurality of application-specific integrated circuits (ASICs) and/or one or a plurality of programmable gate arrays (PGAs), e.g. field programmable gate arrays (FPGAs).

Optionally, the mobile radio communication terminal device 110 may further include a measurement circuit 212 configured to measure received radio signals (e.g. configured to measure the energy of received radio signals). The measurement circuit 212 may be coupled to the receiver 202 via the electrical connection 210. Furthermore, a measurement controller 214 may be provided which may be configured to control the measuring of the measurement circuit 212 to be carried out during the transmission gap on the first frequency carrier. The measurement controller 214 may be coupled e.g. to the measurement circuit 212 e.g. via the electrical connection 210. It is to be noted that the measurement controller 214 may be implemented in a single controller together with the controller 208 or the controller 208 and the measurement controller 214 may be implemented in individual separate devices. In an example, the controller 208 may be configured to determine the transmission gap in accordance with control information signaled by a radio communication network device, e.g. via one or more signalling messages such as e.g. one or more measurement control messages.

As described above, the receiver 202 may include a plurality of receiver parts, wherein a first receiver part of the plurality of receiver parts may be configured to receive radio data signals via the first frequency carrier (in an example, the first receiver part may be coupled to the first receiver antenna 204), and a second receiver part of the plurality of receiver parts may be configured to receive radio data signals via the second frequency carrier (in an example, the second receiver part may be coupled to the second receiver antenna 206). Each of the receiver parts may be configured to receive radio data signals over a receiving bandwidth of at least 5 MHz. In case the receiver 202 has only one part, the receiver 202 may be configured to receive radio data signals over a receiving bandwidth of at least 10 MHz. Furthermore, in an embodiment, the receiver 202 may be configured in accordance with High Speed Downlink Packet Access (HSDPA).

Optionally, the mobile radio communication terminal device 110 may further include a transmitter 216 and one or more transmit antennas 218 coupled to the transmitter 216. It should be noted that a receive antenna 204, 206 and a transmit antenna 218 may be implemented as a single antenna which would then be correspondingly multiplexed (in the time domain and/or in the frequency domain) with respect to the receiving and transmitting of radio signals.

Further optionally, the mobile radio communication terminal device 110 may include an acknowledgement message generating circuit 220 coupled with the transmitter 216. The acknowledgement message generating circuit 220 may be configured to generate one or a plurality of acknowledgement messages acknowledging the receipt of radio data signals via the second frequency carrier during the transmission gap, which may be transmitted by the transmitter 216 after the end of the transmission gap. The acknowledgement message generating circuit 220 may be coupled to the transmitter 216 via the electrical connection 210. It should be noted that the acknowledgement message generating circuit 220 may be implemented in a single controller together with the controller 208 and/or the measurement controller 214 or in individual separate devices or circuits.

The transmitter 216 may be configured to transmit the acknowledgement message via a High Speed Dedicated Physical Control Channel.

Figure 3:
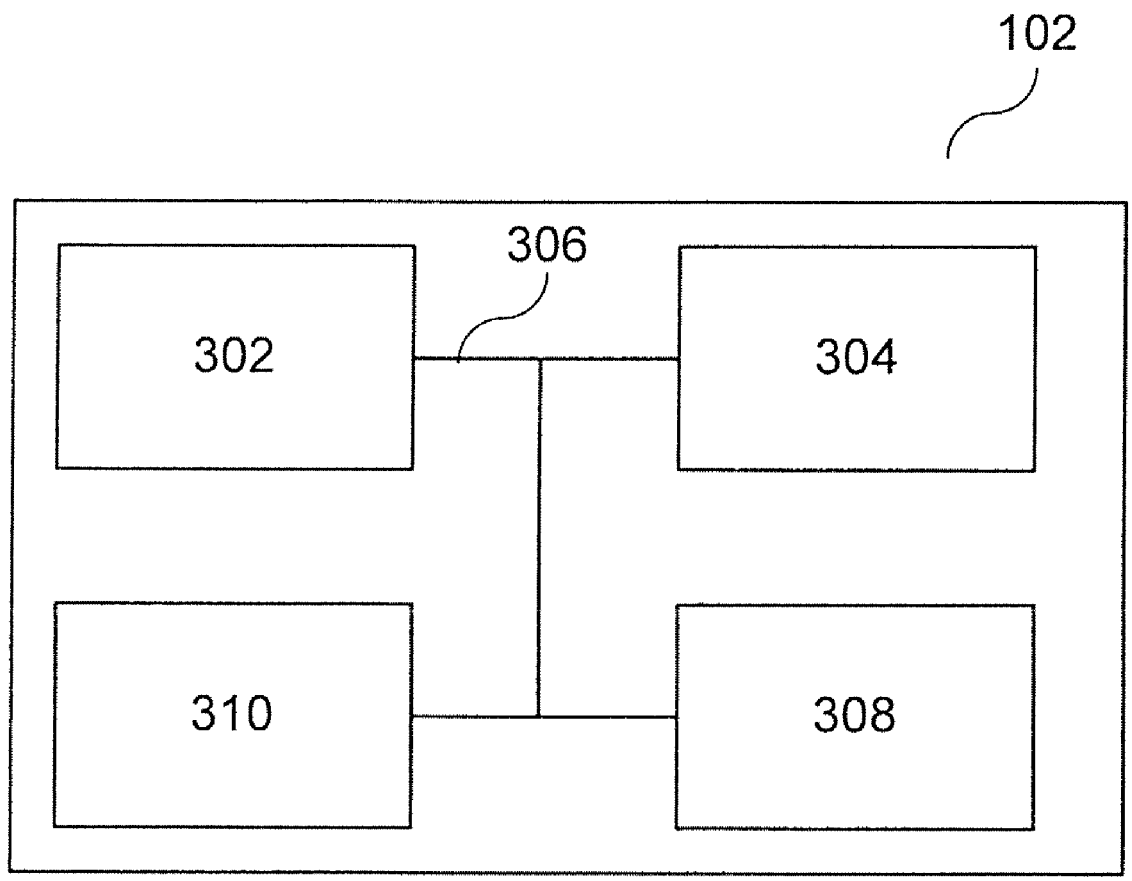
FIG. 3 shows a mobile radio communication network arrangement in accordance with an embodiment in more detail.

FIG. 3 shows a mobile radio communication network arrangement 102 in accordance with an embodiment in more detail. In the simplified illustration of FIG. 3, the mobile radio communication network arrangement 102 may e.g. include components of the one or more mobile radio base stations 104, 106 and e.g. also of the radio network controller (RNC) (not shown in FIG. 1).

By way of example, the mobile radio communication network arrangement 102 may include a transmitter arrangement 302 (e.g. including one or more transmit antennas of the one or more mobile radio base stations 104, 106) configured to transmit radio data signals via a first frequency carrier and a second frequency carrier (e.g. in accordance with HSDPA). Furthermore, the mobile radio communication network arrangement 102 may include a controller 304 configured to control the transmitter arrangement 302 such that the transmitter arrangement 302 does not transmit radio data signals via the first frequency carrier during a transmission gap, and such that the transmitter arrangement 302 transmits radio data signals via the second frequency carrier during the transmission gap. The controller 304 may be coupled to the transmitter arrangement 302 via an electrical connection 306 such as a bus or other type of wiring. Further, optionally, the mobile radio communication network arrangement 102 may include a control information signaling circuit 308 configured to provide control information to a radio communication terminal device indicating the transmission gap. It is to be noted that the control information signaling circuit 308 may be implemented together with the controller 304 in one single processor or in separate circuits or processors, for example. The control information signaling circuit 308 may be coupled to the transmitter arrangement 302 via the electrical connection 306 as well. In an implementation, the transmitter arrangement 302 may be configured in accordance with High Speed Downlink Packet Access (HSDPA). The control information may include parameters for mobile radio signal measurements to be carried out by a radio communication terminal device. The parameters for mobile radio signal measurements may include parameters for at least one type of measurements selected from a group of types consisting of inter-frequency-measurements and inter-Radio Access Technology-measurements. Furthermore, the parameters for mobile radio signal measurements may include gap downlink transmission information about downlink data transmission via the second frequency carrier during the transmission gap. In an optional implementation, the mobile radio communication network arrangement 102 may further include a receiver (together with one or more receive antennas) 310 configured to receive an acknowledgement message acknowledging the receipt of radio data signals via the second frequency carrier during the transmission gap by a radio communication terminal device. In another example, the parameters for mobile radio signal measurements may include acknowledgment priority information about the prioritization of the transmission of the acknowledgment message and/or acknowledgment message combining information about a combination of a plurality of acknowledgment messages acknowledging the receipt of radio data signals via the second frequency carrier during the transmission gap. Furthermore, the parameters for mobile radio signal measurements may include periodicity information indicating whether uplink channel subframes are taken into account when transmitting the acknowledgement message. The receiver 310 may be configured to receive the acknowledgement message via a High Speed Dedicated Physical Control Channel.

In the description of the following implementations of various embodiments, the following assumptions are made without any limitation to the general applicability of the implementations:

A dual-cell HSDPA transmission will be described in accordance with FIG. 1 with the additional assumption that the described mobile radio cells 108 may also be spanned by different mobile radio base stations such as e.g. the first base station (e.g. first NodeB) 104 and the second base station (e.g. second NodeB) 106.

The mobile radio cell 108 (and thus the mobile radio base station), in which the mobile radio terminal device 110 (e.g. the UE 110) is registered, will be referred to as serving cell in the following and the associated FDD frequency bands will be referred to as primary frequency carriers. Thus, in this example, the second mobile radio cell will be referred to as secondary cell in the following and the associated FDD frequency bands will be referred to as secondary carriers.

The mobile radio terminal device(s) 110 (e.g. the UE(s) 110) may have the following radio frequency characteristics:

the mobile radio terminal device(s) 110 (e.g. the UE(s) 110) having only one receiver part and only one transmitter part, have receiving bandwidths of at least 10 MHz ($\geqq 10$ MHz) from a radio frequency technical point of view;

in case the mobile radio terminal device(s) 110 (e.g. the UE(s) 110) have one transmitter part but at least two receiver parts (and thus possibly also two receive antennas), each receiver part supports a receiving bandwidth of at least 5 MHz ($\geqq 5$ MHz) from a radio frequency technical point of view.

In various implementations, as will be described in more detail below, the mobile radio network arrangement 102 may configure the "Compressed Mode" parameters for the measurement of inter-frequency mobile radio cells and/or inter-RAT mobile radio cells to or in a mobile radio terminal device 110 (e.g. a UE 110) with respect to the serving cell and the primary frequency carriers.

In this context, the mobile radio terminal device 110 (e.g. the UE 110) will be signalled in addition to the conventionally signalled control information the following control information (as examples of parameters for mobile radio signal measurements) dependent on its radio frequency capabilities and dependent on the measurement(s) to be carried out:

Gap downlink transmission information about downlink data transmission via the second frequency carrier during the transmission gap, e.g. information about whether a transmission of downlink transmission data is provided on the secondary carrier during the transmission gaps (this may be implemented as a binary information (Yes/No)); in case this parameter is set to the value "Yes", the mobile radio terminal device 110 (e.g. the UE 110) will be controlled to be ready to receive downlink transmission data (e.g. downlink data packets) via the secondary carrier during the transmission gaps.

Information, e.g. parameters for the transmission of the packet data acknowledgement messages for the received data (e.g. received data packets) received via the secondary carrier during the transmission gaps, e.g. the following parameters:

Acknowledgment message combining information about a combination of a plurality of acknowledgment messages acknowledging the receipt of radio data signals via the second frequency carrier during the transmission gap, e.g. information about a number of maximum number of packet data acknowledgements allowed to be combined (e.g. implemented as an Integer value (e.g. "1", . . . , "8"); this parameter illustratively may indicate the number of the packet data acknowledgements, which may be transmitted via (e.g. exactly) one HS-DPCCH subframe in a combined manner.

Acknowledgment priority information about the prioritization of the transmission of the acknowledgment message, e.g. an information of the packet data acknowledgements (e.g. first/last); this information or parameter indicates as to whether the transmission of the first or of the last packet data acknowledgements should be prioritized on the HS-DPCCH; this parameter may be relevant in case the number of the available HS-DPCCH subframes is limited.

Periodicity information indicating whether uplink channel subframes are taken into account when transmitting the acknowledgement message after the end of the transmission gap, e.g. information about the compliance of the period N (this may be implemented as a binary information (Yes/No)); this information or parameter may be relevant in the context of the determination of the possible HS-DPCCH subframes which may be used for the transmission of the packet data acknowledgements for the received data during the respective transmission gap(s); in case e.g. the parameter is set to the value "Yes", then only those HS-DPCCH subframes may be taken into account, which do not exceed the configured number N of the HARQ processes together with HS-DPCCH subframes overlapping with a transmission gap in time; in case the parameter is set to the value "No", then all HS-DPCCH subframes may be taken into account, as long as they do not collide with the packet data acknowledgements for received downlink data packets after the end of the transmission gap(s).

Effects of various embodiments may be seen in:

The performance of the HSDPA data transmission may be improved with respect to data throughput and transmission delay, in particular with rather long transmission gaps.

The described various embodiments may be applied not only to the UMTS W-CDMA communications system but also to e.g. OFDMA (Orthogonal Frequency Division Multiple Access) based systems like LTE (Long Term Evolution), i.e., e.g. further developed and future UMTS communications system.

For the following more concrete implementations, the following configuration will be assumed without any limitation to the general applicability of the implementations:

a UMTS communications system in accordance with W-CDMA and FDD-mode;

a dual-cell HSDPA transmission scenario as described above with reference to FIG. 1, wherein both mobile radio cells may be spanned by two mobile radio base stations 104, 106 (e.g. the first mobile radio base station 104 (e.g. the first NodeB 104) and the second mobile radio base station 106 (e.g. the second NodeB 106));

the mobile radio communication terminal device (e.g. the UE) is registered in the first mobile radio cell "Cell-1", i.e. the first mobile radio cell "Cell-1" is the serving cell and the mobile radio communication terminal device (e.g. the UE) is capable of (and configured to) transmitting and receiving packet data via the primary frequency carriers in the uplink transmission direction and in the downlink transmission direction;

the second mobile radio cell "Cell-2" is the secondary cell for the mobile radio communication terminal device (e.g. the UE); i.e. the mobile radio communication terminal device (e.g. the UE) may capable of (and may be configured to) receiving a second independent data stream via the secondary carrier in the downlink transmission direction.

In a first implementation, a mobile radio communication terminal device (e.g. a UE) is assumed which has only one receiver part and which supports a receiving bandwidth of at least or of exactly 20 MHz ($\geq$20 MHz) from a radio frequency technical point of view. Furthermore, the two mobile radio cells (and thus the first mobile radio base station 104 and the second mobile radio base station 106) may be operated in the 900 MHz frequency band (frequency band VIII). The mobile radio communication terminal device (e.g. the UE) may be configured with respect to its primary frequency carriers "Compressed Mode" parameter for an inter-frequency-FDD-measurement and three inter-RAT-GSM-measurements in accordance with table 1 as described above, i.e. the maximum transmission gap is 14 time slots (=9.33 ms). All four measurements should be applicable for the uplink transmission and the downlink transmission (UL+DL). Due to the radio frequency capabilities of the mobile radio communication terminal device (e.g. the UE), for each type of the measurement, the following information will be signaled to the mobile radio communication terminal device (e.g. the UE):

Inter-Frequency FDD:
Transmission of downlink transmission data (e.g. downlink transmission data packets) via the secondary carrier during the transmission gaps: Yes;
Number packet data acknowledgements allowed to be combined: 4;
Priority of the packet data acknowledgements: First;
Compliance with the period N: Yes.

GSM Carrier RSSI (Received Signal Strength Indicator):
Transmission of downlink transmission data (e.g. downlink transmission data packets) via the secondary carrier during the transmission gaps: Yes;
Number packet data acknowledgements allowed to be combined: 4;
Priority of the packet data acknowledgements: Last;
Compliance with the period N: Yes.

GSM Initial BSIC (Base Transceiver Station Identity Code) Identification:
Transmission of downlink transmission data (e.g. downlink transmission data packets) via the secondary carrier during the transmission gaps: Yes;
Number packet data acknowledgements allowed to be combined: 4;
Priority of the packet data acknowledgements: First;
Compliance with the period N: Yes.

GSM BSIC Re-Confirmation:
Transmission of downlink transmission data (e.g. downlink transmission data packets) via the secondary carrier during the transmission gaps: Yes;

Number packet data acknowledgements allowed to be combined: 4;
Priority of the packet data acknowledgements: First;
Compliance with the period N: Yes.

Figure 7:
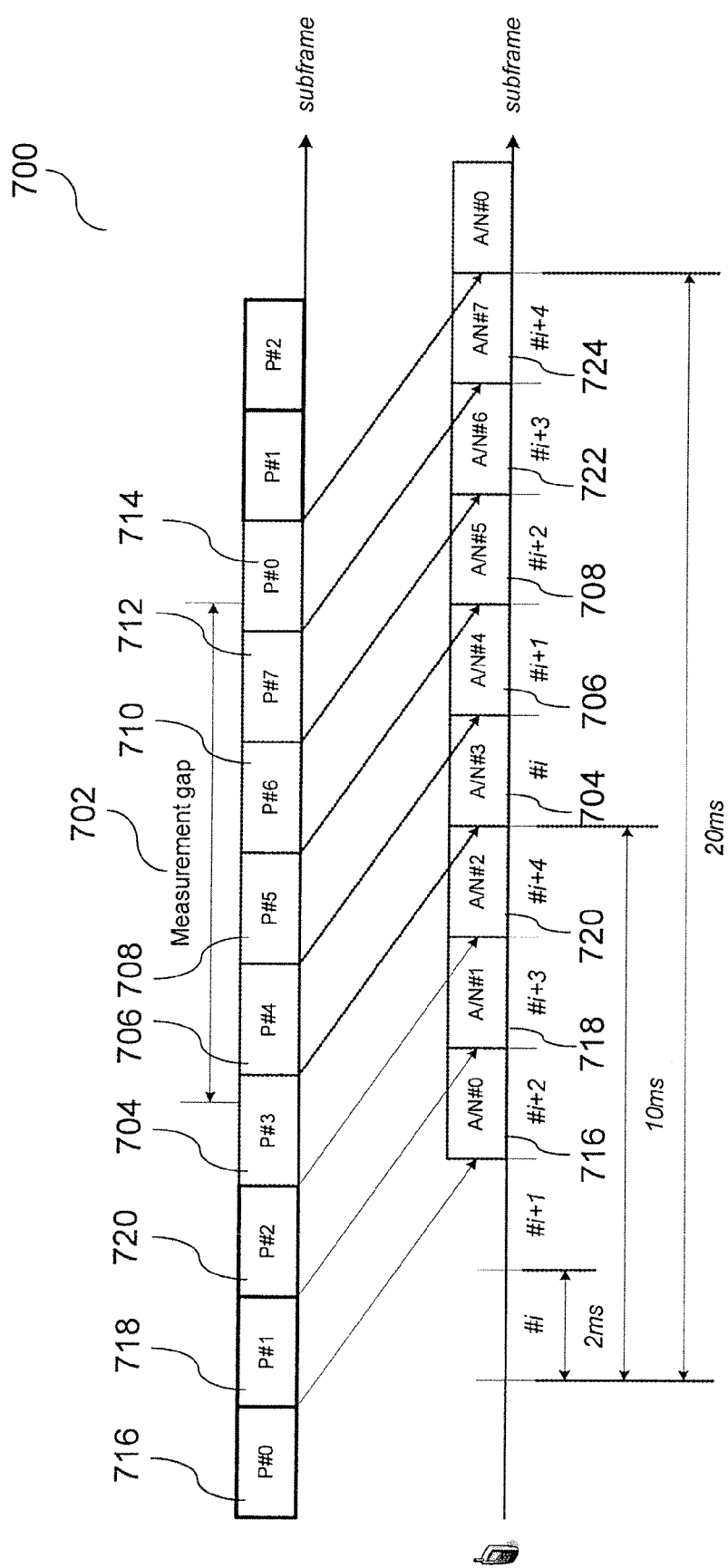
FIG. 7 shows a diagram illustrating the timing of signal transmission in accordance with an embodiment.

In this implementation, the N=8 HARQ processes has been configured to the mobile radio communication terminal device (e.g. the UE) with respect to the HSDPA transmission via the primary frequency carrier and the secondary frequency carrier, in the diagram 700 in FIG. 7 denoted with P#0 to P#7. In the following, the case will be discussed that the mobile radio communication terminal device (e.g. the UE) should carry out the inter-RAT-measurement "GSM Initial BSIC identification". It is assumed that the GSM mobile radio cells to be measured all are within the 20 MHz receiving bandwidth of the mobile radio communication terminal device (e.g. the UE) and that the GSM mobile radio cells do not overlap with the secondary frequency carrier.

A transmission tap 702 overlaps in time with six (6) HARQ processes (namely e.g. P#3 704, P#4 706, P#5 708, P#6 710, P#7 712, and P#0 714). During the transmission gap(s) 702, the first mobile radio base station (e.g. the first NodeB-1) 104 and the mobile radio communication terminal device (e.g. the UE) interrupt their data transmission via the primary frequency carriers in the first mobile radio cell "Cell-1", while the second mobile radio base station (e.g. the second NodeB-2) 106 continuously transmits data via the HS-PDSCH to the mobile radio communication terminal device (e.g. the UE) via the second mobile radio cell "Cell-2" during the transmission gap(s) 702. The mobile radio communication terminal device (e.g. the UE) carries out the GSM measurement during the transmission gap(s) 702 and simultaneously receives data via the HS-PDSCH via the secondary frequency carrier.

Due to the maximum length of the transmission gap(s) 702 of 14 time slots (=9.33 ms), altogether, six HARQ processes are affected, i.e. the mobile radio communication terminal device (e.g. the UE) cannot transmit any acknowledgements (e.g. acknowledgement messages such as positive acknowledgement messages or negative acknowledgement messages) during the transmission gap(s) 702 via the uplink primary frequency carrier for the three HARQ processes P#0 716, P#1 718, and P#2 720 before the transmission gap(s) 702 and for the three HARQ processes P#3 704, P#4 706, and P#5 708 during the transmission gap(s) 702 via the HS-DPCCH.

This may be caught up after the transmission gap(s) 702 as follows:
The mobile radio communication terminal device (e.g. the UE) determines the possible (with respect to the time) HS-DPCCH subframes after the end of the transmission gap(s) 702; in accordance with the scenario shown in FIG. 7, these may be the two subframes A/N#6 722 and A/N#7 724; in this determination, the parameter "Compliance with the period N: Yes" has been taken into account.
All two subframes may be used for the transmission of the acknowledgement messages (ACK/NACK) for the received data received shortly before and during the transmission gap(s) 702; the content of the HS-DPCCH subframes may be as follows in this case:
HS-DPCCH subframe A/N#6 722: Contains the ACK/NAKs for the HARQ processes P#0 716 to P#3 704;
HS-DPCCH subframe A/N#7 724: Contains the ACK/NAKs for the HARQ processes P#4 706 to P#5 708;
For the mapping of the acknowledgement messages (ACK/NACK) to the two HS-DPCCH subframes, the above described parameters "Number packet data acknowledgements allowed to be combined: 4" and "Priority of the packet data acknowledgements: First" have been taken into account.

In a second implementation, a mobile radio communication terminal device (e.g. a UE) is assumed which has two receiver parts, wherein each receiver part supports a receiving bandwidth of at least or of exactly 5 MHz ($\geq$5 MHz) from a radio frequency technical point of view. Furthermore, the two mobile radio cells (and thus the first mobile radio base station 104 and the second mobile radio base station 106) may be operated in the 2 GHz frequency band (frequency band I). The mobile radio communication terminal device (e.g. the UE) may be configured with respect to its primary frequency carriers "Compressed Mode" parameter for one inter-frequency-FDD-measurement and three inter-RAT-GSM-measurements in accordance with table 1 as described above, i.e. the maximum transmission gap is 14 time slots (=9.33 ms). All four measurements should be applicable for the uplink transmission and the downlink transmission (UL+DL). Due to the radio frequency capabilities of the mobile radio communication terminal device (e.g. the UE), for each type of the measurement, the following information will be signaled to the mobile radio communication terminal device (e.g. the UE):

Inter-Frequency FDD:
Transmission of downlink transmission data (e.g. downlink transmission data packets) via the secondary carrier during the transmission gaps: Yes;
Number packet data acknowledgements allowed to be combined: 4;
Priority of the packet data acknowledgements: First;
Compliance with the period N: Yes.
GSM Carrier RSSI (Received Signal Strength Indicator):
Transmission of downlink transmission data (e.g. downlink transmission data packets) via the secondary carrier during the transmission gaps: Yes;
Number packet data acknowledgements allowed to be combined: 4;
Priority of the packet data acknowledgements: Last;
Compliance with the period N: Yes.
GSM Initial BSIC (Base Transceiver Station Identity Code) Identification:
Transmission of downlink transmission data (e.g. downlink transmission data packets) via the secondary carrier during the transmission gaps: Yes;
Number packet data acknowledgements allowed to be combined: 4;
Priority of the packet data acknowledgements: First;
Compliance with the period N: Yes.
GSM BSIC Re-Confirmation:
Transmission of downlink transmission data (e.g. downlink transmission data packets) via the secondary carrier during the transmission gaps: Yes;
Number packet data acknowledgements allowed to be combined: 4;
Priority of the packet data acknowledgements: First;
Compliance with the period N: Yes.

In this implementation, the N=8 HARQ processes has been configured to the mobile radio communication terminal device (e.g. the UE) with respect to the HSDPA transmission via the primary frequency carrier and the secondary frequency carrier, in the diagram 700 in FIG. 7 denoted with P#0 to P#7. In the following, the case will be discussed that the mobile radio communication terminal device (e.g. the UE) should carry out the inter-frequency-FDD-measurement. During the transmission gap(s) 702, the mobile radio communication terminal device (e.g. the UE) uses the first receiver part to carry out these measurements, while simultaneously the mobile radio communication terminal device (e.g. the UE) uses the second receiver part to receive the data via the secondary frequency carrier. The transmission of the acknowledgement messages (ACK/NACK) via the HS-DPCCH for the secondary carrier may be carried out in accordance with the above described first implementation.

Figure 8:
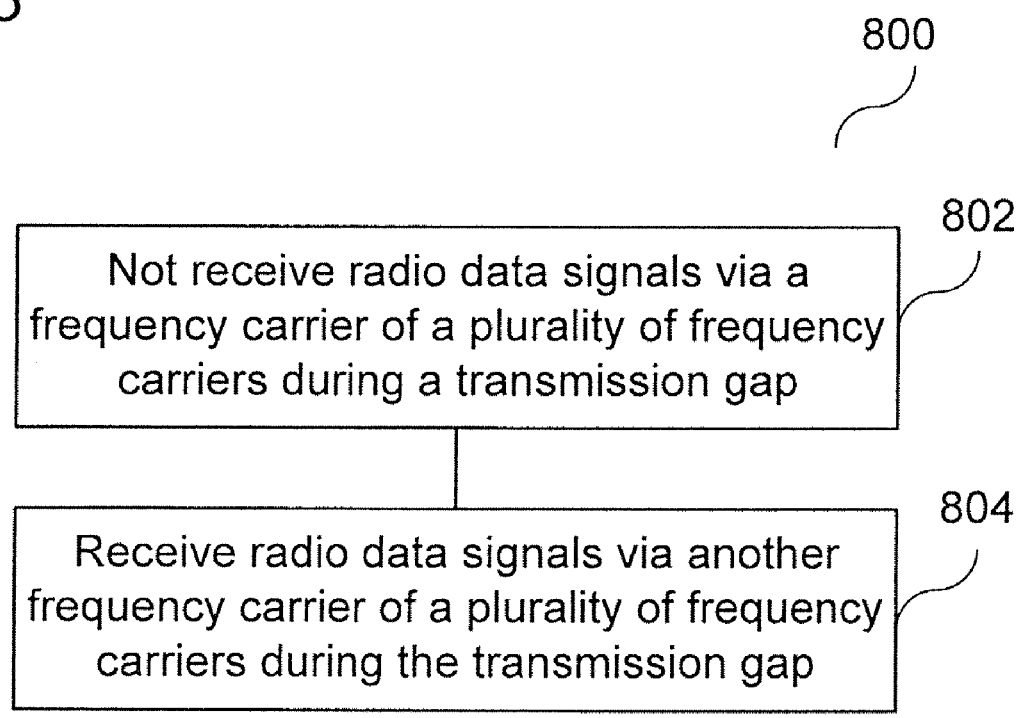
FIG. 8 shows a flow diagram illustrating a method for operating a mobile radio communication terminal device in accordance with an embodiment.

FIG. 8 shows a flow diagram 800 illustrating a method for operating a mobile radio communication terminal device in accordance with an embodiment. In 802, radio data signals are not received (by means e.g. of a corresponding controlling of the mobile radio communication terminal device) via a frequency carrier of a plurality of frequency carriers during a transmission gap. Furthermore, in 804, radio data signals are received via another frequency carrier of a plurality of frequency carriers during the transmission gap.

In an example of this embodiment, the method may further include measuring received radio signals on the first frequency carrier during the transmission gap. In another example of this embodiment, the method may further include determining the transmission gap in accordance with control information signaled by a radio communication network device. In yet another example of this embodiment, the receiving of radio signals may be carried out in accordance with High Speed Downlink Packet Access. In yet another example of this embodiment, the control information may include parameters for mobile radio signal measurements to be carried out by the radio communication terminal device. In yet another example of this embodiment, the parameters for mobile radio signal measurements may include parameters for at least one type of measurements selected from a group of types consisting of inter-frequency-measurements and inter-Radio Access Technology-measurements. In yet another example of this embodiment, the parameters for mobile radio signal measurements may include gap downlink transmission information about downlink data transmission via the second frequency carrier during the transmission gap. In yet another example of this embodiment, the method may further include transmitting an acknowledgement message acknowledging the receipt of radio data signals via the other frequency carrier during the transmission gap. In yet another example of this embodiment, the parameters for mobile radio signal measurements may include acknowledgment priority information about the prioritization of the transmission of the acknowledgment message. In yet another example of this embodiment, the parameters for mobile radio signal measurements may include acknowledgment message combining information about a combination of a plurality of acknowledgment messages acknowledging the receipt of radio data signals via the second frequency carrier during the transmission gap. In yet another example of this embodiment, the parameters for mobile radio signal measurements may include periodicity information indicating whether uplink channel subframes are taken into account when transmitting the acknowledgement message after the end of the transmission gap. In yet another example of this embodiment, the acknowledgement message may be transmitted via a High Speed Dedicated Physical Control Channel.

As has been described above, various embodiments provide for a solution for the transmission of packet data acknowledgement messages in the case of transmission gaps.

In an embodiment, a radio communication terminal device is provided. The radio communication terminal device may include a receiver configured to receive radio data signals via a first frequency carrier and a second frequency carrier, and a controller configured to control the receiver such that the receiver does not receive radio data signals via the first frequency carrier during a transmission gap, and that the receiver receives radio data signals via the second frequency carrier during the transmission gap. In an example of this embodiment, the radio communication terminal device may further include a measurement circuit configured to measure received radio signals, and a measurement controller configured to control the measuring of the measurement circuit to be carried out during the transmission gap on the first frequency carrier. In another example of this embodiment, the controller is further configured to determine the transmission gap in accordance with control information signaled by a radio communication network device. In yet another example of this embodiment, the receiver may include a plurality of receiver parts, wherein a first receiver part of the plurality of receiver parts is configured to receive radio data signals via the first frequency carrier, and wherein a second receiver part of the plurality of receiver parts is configured to receive radio data signals via the second frequency carrier. In yet another example of this embodiment, the receiver is configured in accordance with High Speed Downlink Packet Access. In yet another example of this embodiment, the receiver may be configured to receive radio data signals over a receiving bandwidth of at least 10 MHz. In yet another example of this embodiment, in which the receiver includes a plurality of receiver parts, each receiver part of the first receiver part and the second receiver part may be configured to receive radio data signals over a receiving bandwidth of at least 5 MHz. In yet another example of this embodiment, the control information may include parameters for mobile radio signal measurements to be carried out by the radio communication terminal device. In yet another example of this embodiment, the parameters for mobile radio signal measurements may include parameters for at least one type of measurements selected from a group of types consisting of inter-frequency-measurements and inter-Radio Access Technology-measurements. In yet another example of this embodiment, the parameters for mobile radio signal measurements may include gap downlink transmission information about downlink data transmission via the second frequency carrier during the transmission gap. In yet another example of this embodiment, the radio communication terminal device may further include a transmitter configured to transmit an acknowledgement message acknowledging the receipt of radio data signals via the second frequency carrier during the transmission gap. In yet another example of this embodiment, the parameters for mobile radio signal measurements may include acknowledgment priority information about the prioritization of the transmission of the acknowledgment message. In yet another example of this embodiment, the parameters for mobile radio signal measurements may include acknowledgment message combining information about a combination of a plurality of acknowledgment messages acknowledging the receipt of radio data signals via the second frequency carrier during the transmission gap. In yet another example of this embodiment, the parameters for mobile radio signal measurements may include periodicity information indicating whether uplink channel subframes are taken into account when transmitting the acknowledgement message after the end of the transmission gap. In yet another example of this embodiment, the transmitter may be configured to transmit the acknowledgement message via a High Speed Dedicated Physical Control Channel. In yet another example of this embodiment, the radio communication terminal device may further include an acknowledgement message generator configured to generate an acknowledgement message acknowledging the receipt of radio data signals via the second frequency carrier during the transmission gap. The acknowledgement message generator may be implemented e.g. in the controller or as a separate circuit. In yet another example of this embodiment, the acknowledgement message generator may be configured to generate the acknowledgement message in accordance with the acknowledgment priority information. In yet another example of this embodiment, the acknowledgement message generator may be configured to generate the acknowledgement message in accordance with the acknowledgment message combining information.

In another embodiment, a radio communication terminal device is provided. The radio communication terminal device may include a receiver configured to receive radio data signals via a first frequency carrier and a second frequency carrier, a controller configured to control the receiver such that the receiver does not receive radio data signals via the first frequency carrier during a transmission gap, and such that the receiver receives radio data signals via the second frequency carrier during the transmission gap, a measurement circuit configured to measure received radio signals, a measurement controller configured to control the measuring of the measurement circuit to be carried out during the transmission gap on the first frequency carrier, and a transmitter configured to transmit an acknowledgement message acknowledging the receipt of radio data signals via the second frequency carrier during the transmission gap. In an example of this embodiment, the controller may further be configured to determine the transmission gap in accordance with control information signaled by a radio communication network device. In another example of this embodiment, the receiver may include a plurality of receiver parts, wherein a first receiver part of the plurality of receiver parts is configured to receive radio data signals via the first frequency carrier, and wherein a second receiver part of the plurality of receiver parts is configured to receive radio data signals via the second frequency carrier. In yet another example of this embodiment, the receiver may be configured in accordance with High Speed Downlink Packet Access. In yet another example of this embodiment, the receiver may be configured to receive radio data signals over a receiving bandwidth of at least 10 MHz. In yet another example of this embodiment, in which the receiver includes a plurality of receiver parts, each receiver part of the first receiver part and the second receiver part may be configured to receive radio data signals over a receiving bandwidth of at least 5 MHz. In yet another example of this embodiment, the control information may include parameters for mobile radio signal measurements to be carried out by the radio communication terminal device. In yet another example of this embodiment, the parameters for mobile radio signal measurements may include parameters for at least one type of measurements selected from a group of types consisting of inter-frequency-measurements and inter-Radio Access Technology-measurements. In yet another example of this embodiment, the parameters for mobile radio signal measurements may include gap downlink transmission information about downlink data transmission via the second frequency carrier during the transmission gap. In yet another example of this embodiment, the parameters for mobile radio signal measurements may include acknowledgment priority information about the prioritization of the transmission of the acknowledgment message. In yet another example of this embodiment, the parameters for mobile radio signal measurements may include acknowledgment message combining information about a combination of a plurality of acknowledgment messages acknowledging the receipt of radio data signals via the second frequency carrier during the transmission gap. In yet another example of this embodiment, the parameters for mobile radio signal measurements may include periodicity information indicating whether uplink channel subframes are taken into account when transmitting the acknowledgement message after the end of the transmission gap. In yet another example of this embodiment, the transmitter may be configured to transmit the acknowledgement message via a High Speed Dedicated Physical Control Channel. In yet another example of this embodiment, the radio communication terminal device may further include an acknowledgement message generator configured to generate an acknowledgement message acknowledging the receipt of radio data signals via the second frequency carrier during the transmission gap. The acknowledgement message generator may be implemented e.g. in the controller or as a separate circuit. In yet another example of this embodiment, the acknowledgement message generator may be configured to generate the acknowledgement message in accordance with the acknowledgment priority information. In yet another example of this embodiment, the acknowledgement message generator may be configured to generate the acknowledgement message in accordance with the acknowledgment message combining information.

In yet another embodiment, a radio communication terminal device is provided. The radio communication terminal device may include a receiver configured to receive radio data signals via a plurality of frequency carriers, a measurement circuit configured to measure received radio signals, a measurement controller configured to control the measuring of the measurement circuit to be carried out during a transmission gap on a frequency carrier of the plurality of frequency carriers, and a transmitter configured to transmit an acknowledgement message acknowledging the receipt of radio data signals via the other frequency carriers of the plurality of frequency carriers during the transmission gap. In an example of this embodiment, the radio communication terminal device may further include a controller configured to control the receiver such that the receiver does not receive radio data signals via the frequency carriers of the plurality of frequency carriers during a transmission gap, and such that the receiver receives radio data signals via the other frequency carriers of the plurality of frequency carriers during the transmission gap. In another example of this embodiment, the controller may further be configured to determine the transmission gap in accordance with control information signaled by a radio communication network device. In yet another example of this embodiment, the receiver may include a plurality of receiver parts, wherein a first receiver part of the plurality of receiver parts is configured to receive radio data signals via the first frequency carrier, wherein a second receiver part of the plurality of receiver parts is configured to receive radio data signals via the second frequency carrier, wherein a third receiver part of the plurality of receiver parts is configured to receive radio data signals via the third frequency carrier and so on. In yet another example of this embodiment, the receiver may be configured in accordance with High Speed Downlink Packet Access. In yet another example of this embodiment, the receiver may be configured to receive radio data signals over a receiving bandwidth of at least 10 MHz. In yet another example of this embodiment, in which the receiver includes a plurality of receiver parts, each receiver part of the plurality of receiver parts may be configured to receive radio data signals over a receiving bandwidth of at least 5 MHz. In yet another example of this embodiment, the control information may include parameters for mobile radio signal measurements to be carried out by the radio communication terminal device. In yet another example of this embodiment, the parameters for mobile radio signal measurements may include gap downlink transmission information about downlink data transmission via the plurality of frequency carriers during the transmission gap. In yet another example of this embodiment, the parameters for mobile radio signal measurements may include acknowledgment priority information about the prioritization of the transmission of the acknowledgment message. In yet another example of this embodiment, the parameters for mobile radio signal measurements may include acknowledgment message combining information about a combination of a plurality of acknowledgment messages acknowledging the receipt of radio data signals via the second frequency carrier during the transmission gap. In yet another example of this embodiment, the parameters for mobile radio signal measurements may include periodicity information indicating whether uplink channel subframes are taken into account when transmitting the acknowledgement message after the end of the transmission gap. In yet another example of this embodiment, the transmitter may be configured to transmit the acknowledgement message via a High Speed Dedicated Physical Control Channel. In yet another example of this embodiment, the radio communication terminal device may further include an acknowledgement message generator configured to generate an acknowledgement message acknowledging the receipt of radio data signals via the second frequency carrier during the transmission gap. The acknowledgement message generator may be implemented e.g. in the controller or as a separate circuit. In yet another example of this embodiment, the acknowledgement message generator may be configured to generate the acknowledgement message in accordance with the acknowledgment priority information. In yet another example of this embodiment, the acknowledgement message generator may be configured to generate the acknowledgement message in accordance with the acknowledgment message combining information.

In yet another embodiment, a radio communication network arrangement is provided. The radio communication network arrangement may include a transmitter arrangement configured to transmit radio data signals via a first frequency carrier and a second frequency carrier, and a controller configured to control the transmitter arrangement such that the transmitter arrangement does not transmit radio data signals via the first frequency carrier during a transmission gap, and such that the transmitter arrangement transmits radio data signals via the second frequency carrier during the transmission gap. In an example of this embodiment, the radio communication network arrangement may further include a control information signaling circuit configured to provide control information to a radio communication terminal device indicating the transmission gap. In another example of this embodiment, the transmitter arrangement may be configured in accordance with High Speed Downlink Packet Access. In yet another example of this embodiment, the control information may include parameters for mobile radio signal measurements to be carried out by a radio communication terminal device. In yet another example of this embodiment, the parameters for mobile radio signal measurements may include parameters for at least one type of measurements selected from a group of types consisting of inter-frequency-measurements and inter-Radio Access Technology-measurements. In yet another example of this embodiment, the parameters for mobile radio signal measurements may include gap downlink transmission information about downlink data transmission via the second frequency carrier during the transmission gap. In yet another example of this embodiment, radio communication network arrangement may further include a receiver configured to receive an acknowledgment message acknowledging the receipt of radio data signals via the second frequency carrier during the transmission gap by a radio communication terminal device. In yet another example of this embodiment, the parameters for mobile radio signal measurements may include acknowledgment priority information about the prioritization of the transmission of the acknowledgment message. In yet another example of this embodiment, the parameters for mobile radio signal measurements may include acknowledgment message combining information about a combination of a plurality of acknowledgment messages acknowledging the receipt of radio data signals via the second frequency carrier during the transmission gap. In yet another example of this embodiment, the parameters for mobile radio signal measurements may include periodicity information indicating whether uplink channel subframes are taken into account when transmitting the acknowledgement message after the end of the transmission gap. In yet another example of this embodiment, the receiver may be configured to receive the acknowledgement message via a High Speed Dedicated Physical Control Channel.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A radio communication terminal device, comprising:
   a receiver configured to receive first radio data signals and second radio data signals via a first frequency carrier and a second frequency carrier, respectively;
   a controller configured to control the receiver such that
      the receiver does not receive the first radio data signals via the first frequency carrier during a transmission gap; and
      the receiver receives the second radio data signals via the second frequency carrier during the transmission gap, wherein the controller is further configured to determine the transmission gap in accordance with control information signaled by a radio communication network device, wherein the control information comprises parameters for mobile radio signal measurements to be carried out by the radio communication terminal device; and
   a transmitter configured to transmit an acknowledgement message after the transmission gap, wherein the acknowledgment message acknowledges the receipt of the second radio data signals received via the second frequency carrier, and wherein the parameters for mobile radio signal measurements comprise acknowledgement priority information about the prioritization of the transmission of the acknowledgment message.

2. The radio communication terminal device of claim 1, further comprising:
   a measurement circuit configured to measure received radio signals;
   a measurement controller configured to control the measuring of the measurement circuit to be carried out during the transmission gap on the first frequency carrier.

3. The radio communication terminal device of claim 1,
   wherein the receiver comprising a plurality of receiver parts;
   wherein a first receiver part of the plurality of receiver parts is configured to receive the first radio data signals via the first frequency carrier; and wherein a second receiver part of the plurality of receiver parts is configured to receive the second radio data signals via the second frequency carrier.

4. The radio communication terminal device of claim 3, wherein each receiver part of the first receiver part and the second receiver part is configured to receive the first and second radio data signals over a receiving bandwidth of at least 5 MHz.

5. The radio communication terminal device of claim 1, wherein the receiver is configured to receive the first and second radio data signals over a receiving bandwidth of at least 10 MHz.

6. The radio communication terminal device of claim 1, wherein the parameters for mobile radio signal measurements comprise gap downlink transmission information about downlink data transmission via the second frequency carrier during the transmission gap.

7. The radio communication terminal device of claim 1, wherein the transmitter is further configured to transmit a plurality of acknowledgement messages acknowledging the receipt of the second radio data signals received via the second frequency carrier during the transmission gap, wherein the parameters for mobile radio signal measurements comprise acknowledgement message combining information about a combination of the plurality of acknowledgement messages.

8. The radio communication terminal device of claim 7, further comprising an acknowledgement message generator configured to generate the plurality of acknowledgement messages in accordance with the acknowledgement message combining information.

9. The radio communication terminal device of claim 1, wherein the parameters for mobile radio signal measurements comprise periodicity information indicating whether uplink channel subframes are taken into account when transmitting the acknowledgement message after the end of the transmission gap.

10. The radio communication terminal device of claim 1, further comprising:
an acknowledgement message generator configured to generate the acknowledgement message.

11. The radio communication terminal device of claim 1, further comprising an acknowledgement message generator configured to generate the acknowledgement message in accordance with the acknowledgement priority information.

12. A radio communication terminal device comprising:
a receiver configured to receive first radio data signals and second radio data signals via a first frequency carrier and a second frequency carrier, respectively;
a controller configured to control the receiver such that
the receiver does not receive the first radio data signals via the first frequency carrier during a transmission gap; and
the receiver receives the second radio data signals via the second frequency carrier during the transmission gap;
a measurement circuit configured to measure received radio signals;
a measurement controller configured to control the measuring of the measurement circuit to be carried out during the transmission gap on the first frequency carrier;
an acknowledgement message generator configured to generate a plurality of acknowledgement messages acknowledging the receipt of the second radio data signals received via the second frequency carrier during the transmission gap; and
a transmitter configured to transmit the plurality of acknowledgement messages via at least one subframe after the transmission gap, in which the at least one subframe includes the plurality of acknowledgment messages, wherein the plurality of acknowledgement messages acknowledges the receipt of the second radio data signals received via the second frequency carrier during the transmission gap,
wherein the acknowledgement message generator is configured to generate the acknowledgement message in accordance with acknowledgment message combining information about a combination of a plurality of acknowledgment messages acknowledging the receipt of the second radio data signals received via the second frequency carrier during the transmission gap contained in control information.

13. A radio communication network system, comprising:
a transmitter system configured to transmit first radio data signals and second radio data signals via a first frequency carrier and a second frequency carrier, respectively;
a controller configured to control the transmitter system such that
the transmitter system does not transmit the first radio data signals via the first frequency carrier during a transmission gap; and
the transmitter system transmits the second radio data signals via the second frequency carrier during the transmission gap; and
a control information signaling circuit configured to provide control information to a radio communication terminal device indicating the transmission gap, and wherein the control information signaling circuit is further configured to provide parameters for mobile radio signal measurements to be carried out by the radio communication terminal device, and wherein the parameters for mobile radio signal measurements comprise:
acknowledgment message combining information about a combination of a plurality of acknowledgment messages acknowledging the receipt of the second radio data signals received via the second frequency carrier during the transmission gap; and
periodicity information indicating whether uplink channel subframes are taken into account when transmitting the plurality of acknowledgement messages after the end of the transmission gap.

14. The radio communication network system of claim 13, wherein the parameters for mobile radio signal measurements further comprise at least one parameter selected from a group of parameters consisting of:
parameters for at least one type of measurements selected from a group of types consisting of inter-frequency-measurements and inter-Radio Access Technology-measurements;
gap downlink transmission information about downlink data transmission via the second frequency carrier during the transmission gap; and
acknowledgment priority information about the prioritization of the transmission of the plurality of acknowledgment messages.

* * * * *